(12) United States Patent
Baker et al.

(10) Patent No.: US 7,062,562 B1
(45) Date of Patent: Jun. 13, 2006

(54) METHODS AND APPARATUS FOR CONTENT SERVER SELECTION

(75) Inventors: Frederick Baker, Santa Barbara, CA (US); Bruce Lueckenhoff, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 09/833,387

(22) Filed: Apr. 11, 2001

(51) Int. Cl.
G06F 15/16 (2006.01)

(52) U.S. Cl. ............ 709/227; 709/203; 709/223; 709/224; 709/226; 709/232; 718/105

(58) Field of Classification Search ........... 709/203, 709/223, 224, 225–229, 232; 370/471, 472, 370/474, 476, 238; 718/105
See application file for complete search history.

(56) References Cited

U.S. PATENT DOCUMENTS

| 5,414,704 | A | | 5/1995 | Spinney |
| 5,488,412 | A | | 1/1996 | Majeti et al. |
| 5,506,987 | A | | 4/1996 | Abramson et al. |
| 5,586,121 | A | | 12/1996 | Moura et al. |
| RE35,774 | E | | 4/1998 | Moura et al. |
| 5,774,668 | A | * | 6/1998 | Choquier et al. ........... 709/227 |
| 5,818,845 | A | | 10/1998 | Moura et al. |
| 5,828,655 | A | | 10/1998 | Moura et al. |
| 5,859,852 | A | | 1/1999 | Moura et al. |
| 5,872,773 | A | | 2/1999 | Katzela et al. |
| 5,892,903 | A | | 4/1999 | Klaus |
| 5,946,047 | A | | 8/1999 | Levan |
| 5,946,048 | A | | 8/1999 | Levan |
| 5,950,205 | A | | 9/1999 | Aviani, Jr. |
| 5,953,335 | A | | 9/1999 | Erimli et al. |
| 5,953,375 | A | * | 9/1999 | Nishiwaki et al. .......... 375/259 |
| 5,956,346 | A | | 9/1999 | Levan |
| 5,959,660 | A | | 9/1999 | Levan |
| 5,959,968 | A | | 9/1999 | Chin et al. |
| 5,959,997 | A | | 9/1999 | Moura et al. |
| 5,989,060 | A | | 11/1999 | Coile et al. |
| 6,006,266 | A | | 12/1999 | Murphy et al. |
| 6,016,388 | A | | 1/2000 | Dillon |
| 6,052,718 | A | | 4/2000 | Gifford |
| 6,092,178 | A | * | 7/2000 | Jindal et al. ................. 718/105 |
| 6,101,543 | A | * | 8/2000 | Alden et al. ................. 709/229 |
| 6,212,190 | B1 | * | 4/2001 | Mulligan .................... 370/474 |

(Continued)

OTHER PUBLICATIONS

U.S. Appl. No. 09/606,418, filed Jun. 2000, Aviani et al.*

(Continued)

*Primary Examiner*—Ario Etienne
*Assistant Examiner*—Ramy M Osman
(74) *Attorney, Agent, or Firm*—Beyer Weaver & Thomas, LLP

(57) ABSTRACT

Methods and apparatus providing information about characteristics associated with a network are described. A network node associated with a client for selecting a server that can best provide content to a client transmits a request for a response. A plurality of content servers or content routing agents receive requests corresponding to the request from the network node associated with the client. The content servers provide a response and fragment and/or pad datagrams associated with the response. The content servers transmit these fragmented and/or padded datagrams to the network node associated with the client. The network node associated with the client can reassemble and/or trim the received datagrams and identify as optimal the server that first completes transmission of the response.

29 Claims, 4 Drawing Sheets

U.S. PATENT DOCUMENTS

| | | | |
|---|---|---|---|
| 6,260,070 B1 | 7/2001 | Shah | 709/230 |
| 6,345,294 B1 | 2/2002 | O'Toole et al. | |
| 6,446,121 B1 | 9/2002 | Shah et al. | 709/224 |
| 6,477,522 B1 * | 11/2002 | Young | 709/224 |
| 6,522,651 B1 * | 2/2003 | Herrmann | 370/471 |
| 6,542,468 B1 * | 4/2003 | Hatakeyama | 370/238 |
| 6,606,643 B1 * | 8/2003 | Emens et al. | 709/224 |
| 6,795,858 B1 * | 9/2004 | Jain et al. | 709/226 |
| 6,810,411 B1 * | 10/2004 | Coughlin et al. | 709/203 |
| 6,856,991 B1 * | 2/2005 | Srivastava | 718/105 |

OTHER PUBLICATIONS

Eager et al., "Adaptive Load Sharing in Homogeneous Distributed Systems," IEEE, Transactions on Software Engineering, vol. Se-12, No. 5, May 1986, PP 662-675.

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net. No date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan., 2000, Internet Engineering Task Force, 9 pages.

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No.: 60/160,535, filed Oct. 20, 1999, 127 Pages.

Lu et al., "Method and Apparatus for Automatic Network Address Assignment," U.S. Appl. No.: 60/178,063, filed Jan. 24, 2000, 74 Pages.

Johnson et al., "Method and Apparatus for Determining a Network Topology in the Presence of Network Address Translation," U.S. Appl. No.: 60/178,062, filed Jan. 24, 2000, 32 Pages.

Toole et al., "Fast-Changing Network Status and Load Monitoring and Feedback," U.S. Appl. No.: 60/177,985 filed Jan. 25, 2000, 20 Pages.

Kirk Johnson, "A Method and Apparatus for Minimalist Approach to Implementing Server Selection," U.S. Appl. No.: 60/177,415, filed Jan. 21, 2000, 39 Pages.

\* cited by examiner

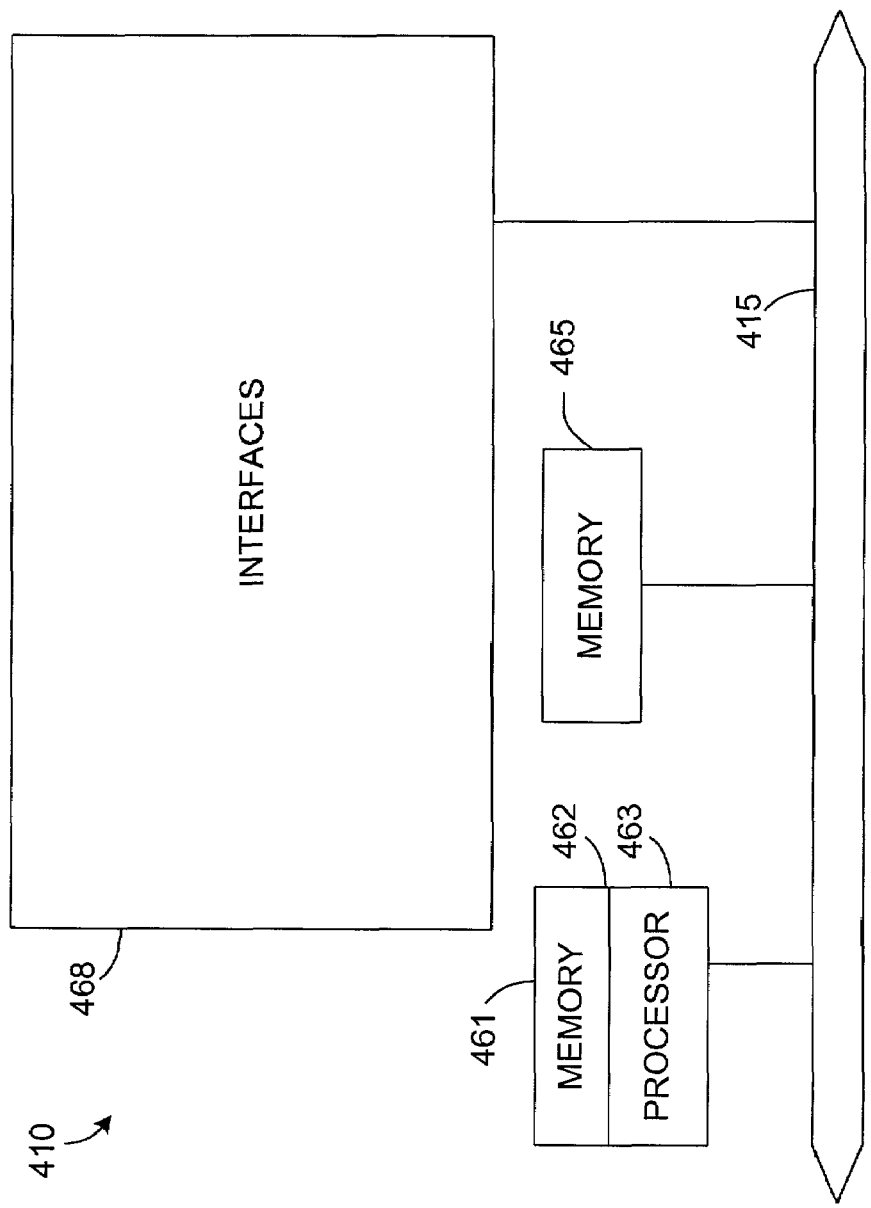

METHODS AND APPARATUS FOR CONTENT SERVER SELECTION

BACKGROUND OF THE INVENTION

The present invention relates to providing information about characteristics associated with a network. More particularly, the present invention provides methods and apparatus for providing characteristics to a network node responsible for selecting a content server. The frames of reference for the present invention are the content servers or content routing agents that can provide information that a client requests.

A network user can often retrieve identical content from a number of mirror sites. Content is often distributed onto mirroring sites across a network such as the Internet in order to give users optimal access to the information. A number of techniques have been used to select a server that can provide the content to the user. However, as described further below, these conventional techniques may fail to select a server that can best provide the content to the user. A server that can best provide content to a client may transmit over a route that has the best available combination of latency, bandwidth and reliability and can be referred to as a content server or a content routing agent.

One method for selecting a content server gives much of the discretion to the user. Users wishing to download a piece of software may be directed to select a server location closest to their own location. Several problems arise out of this technique. Geographic proximity may not be equivalent to network proximity. Two cities may neighbor each other geographically, but the cities may not have a direct network connection. Network traffic may flow through a geographically distant third city. Alternatively, the network lines connecting the two neighboring cities may have limited bandwidth, while the lines connected to the distant third city may have bandwidth to spare.

Some techniques for selecting a server employ systems at a primary domain name server. When a user requests particular content, these systems interact with the primary domain name server to identify a content server. The system identifies the content server and then returns the IP address of that server as part of its DNS reply. These systems may select a server from a list of identical servers randomly. This works to prevent any particular content server from carrying a disproportionate load of network traffic. This system may balance server load across a list of content servers, but it does not assure that the user receives service from a content server that would provide the optimal response. In fact, it does not even prevent the user from receiving service from a content server that would provide the slowest response. This system may in fact worsen loads at already congested content servers. The random number generator for the system may exhibit non-random characteristics, and still direct a disproportionate amount of traffic towards particular content servers.

Another technique for increasing the efficiency with which data requests are serviced is described in commonly assigned, copending U.S. patent application Ser. No. 09/606,418 with a title WIDE AREA LOAD BALANCING OF WEB TRAFFIC as of its Jun. 28, 2000 date of filing, the entirety of which is incorporated herein by reference for all purposes. The copending application describes aspects of the Boomerang process where in a specific embodiment, each site with an IP address corresponding to a domain name is requested to respond to a Domain Name System (DNS) query. The first server to complete a response through the network lines is deemed to be the optimal server. The Boomerang process typically identifies the server with the lowest network delay between itself and the client's local DNS server at the moment of transmission.

This presents an accurate depiction of the round trip time at the moment of transmission. However, other factors, such as drop rate and available bandwidth, may not be adequately considered by a system using the Boomerang process. A content server may be the first to successfully transmit a response message through the network even though the drop rate was undesirably high. Alternatively, a content server may be the first to respond even though the route traversed was near its maximum capacity.

Each of the currently available techniques for selecting a server to provide content to a user in the best possible manner has its own disadvantages with regard to at least some of the desirable characteristics of systems for selecting a content server. It is therefore desirable to provide a system for selecting a content server that exhibits desirable characteristics as well or better than the technologies discussed above.

SUMMARY OF THE INVENTION

According to the present invention, methods and apparatus are provided to select from a group of servers a particular server that can provide content to a client in an optimal manner.

Certain network nodes contain the addresses of a group of servers that can provide the same content. In one embodiment, such a network node is a DNS server. When a client submits a domain name to the DNS server, the present invention selects the server corresponding to the domain name that can best provide content to the client. According to specific embodiments, the server selection system may be integrated into a DNS server, or may be collocated with a DNS server. The system for selecting a server identifies a set of available content servers distinct from the name server and transmits a request for a response from each of the content servers. The server selection system may request an immediate or a delayed response.

The content servers that receive a request for a response can provide a response message. In one embodiment of the invention, the content server may need to divide the response message into fragments in order to transmit the fragments onto the network. Alternatively, the entire response message may be transmittable as a single datagram. The content server provides the response datagram transmittable onto the network. Prior to transmitting the fragments onto the network, however, the content server or associated logic or apparatus further divides the response fragments. In one embodiment of the invention, each of the response fragments suitable for transmission is divided into three smaller fragments. These multiple response fragments can then be transmitted over network lines to the system for selecting a server. Some of the fragments may be transmitted after a delay, or the separate fragments can be transmitted simultaneously.

A network node associated with the client receives the individual response fragments and reassembles the fragments into response messages. According to specific embodiments, the network node associated with the client can be the client's local domain name server. According to other embodiments, the network node associated with the client can be a server selection system. The first content server to successfully transmit all of the response fragments to the network node associated with the client can be identified as the best server for providing content to a client.

In another embodiment of the invention, the content routing agent (content server) receives a request for a response and provides a response message. The content server may need to divide the response message into fragments or the entire response message may be transmittable as a single datagram. According to specific embodiments, the content server provides the response datagram transmittable onto the network. Prior to transmitting the datagram onto the network, the content server or associated logic or apparatus pads the response datagram. The response datagram can be padded in a specific embodiment by increasing the value of the network layer length field while not increasing the transport layer length field. The response fragments may be padded with data or any arrangement of bits. These multiple response fragments can then be transmitted to a node associated with the client. The node associated with the client receives the response message and removes the excess from the response datagram. The first content server to successfully transmit the response to the network node associated with the client can be identified as the best server for providing content to a client.

In other embodiments, combinations of the above aspects of the present invention can be used. A response datagram can be identified and subdivided into multiple fragments. These multiple fragments can each be padded with additional data. The node associated with the client receives the response message fragments and removes the excess from each fragment. The first content server to successfully transmit the padded response fragments to the network node associated with the client can be identified as the best server.

One aspect of the invention provides a method for providing information for selecting a content server to a network node associated with a client. The method can be characterized by the following sequence: (1) receiving a request for a response, wherein the request corresponds to a message transmitted by a network node associated with a client for selecting a content server; (2) providing a response datagram, the response datagram associated with the received request; (3) providing a padded response datagram, wherein the padded response datagram is obtained by padding the response datagram with an arrangement of bits; and (4) transmitting the padded response datagram to the network node associated with the client for selecting a content server wherein reception of the padded response datagram by the network node provides information for selecting a content server.

The network layer length fields of the response fragments can also be increased while maintaining the transport layer length fields.

Another aspect of the invention provides an apparatus for providing network information for selecting a content server to a network node associated with a client. The apparatus can be characterized by the following features: (1) memory; (2) an input interface for receiving a request for a response, wherein the request corresponds to a message transmitted by a network node associated with a client for selecting a content server; (3) one or more processors coupled with the memory, the processors configured to provide a response datagram, the response datagram corresponding to the received request wherein the processors are configured to provide a padded response datagram, the padded response datagram obtained by padding the response datagram with an arrangement of bits; (4) an output interface for transmitting the padded response datagram to the network node associated with the client wherein reception of the padded response datagram by the network node provides information for selecting a content server.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

FIG. 4 shows a network node suitable for implementing the present invention, according to specific embodiments.

DETAILED DESCRIPTION OF SPECIFIC EMBODIMENTS

Figure 1:
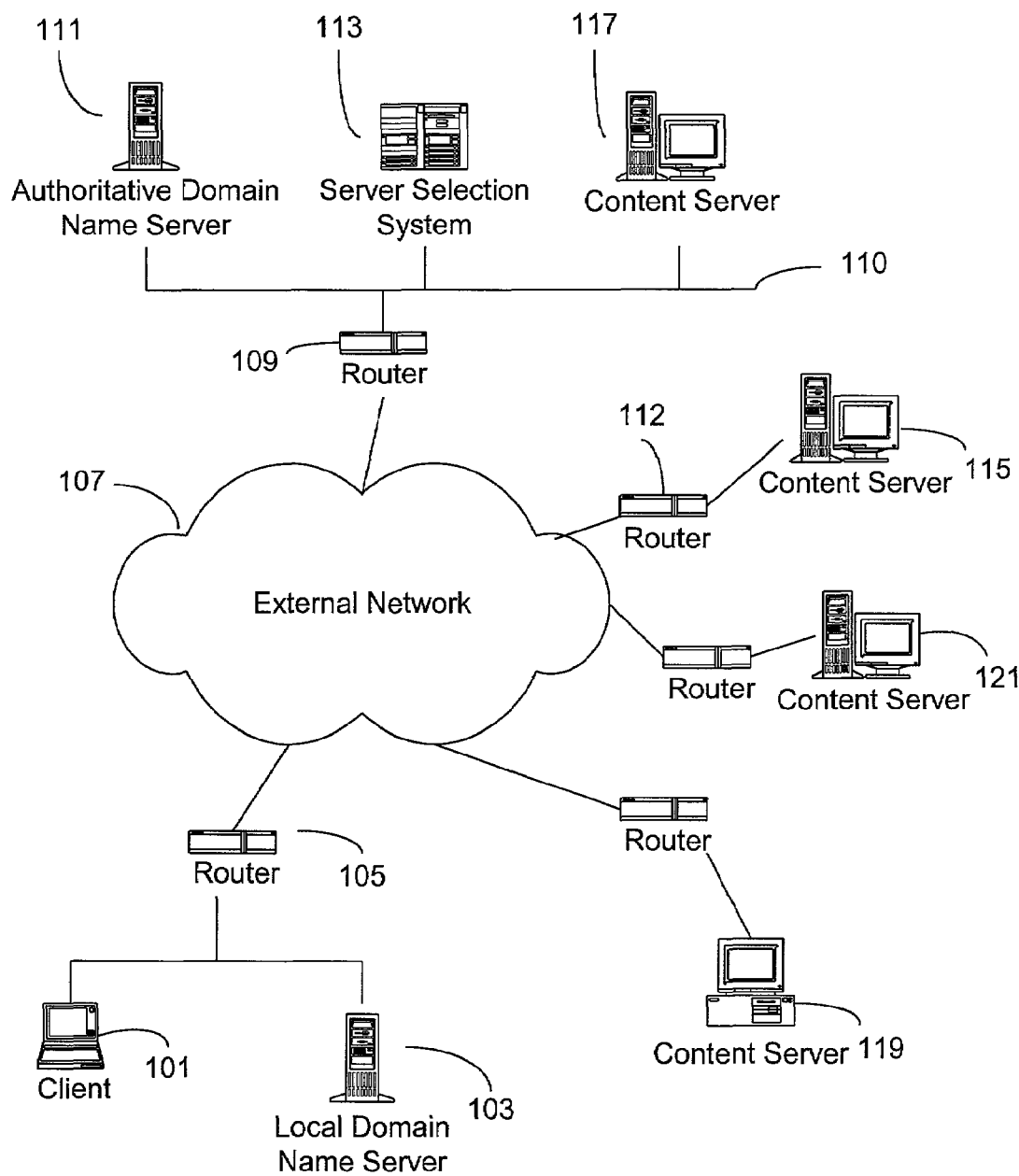
FIG. 1 is a block diagram showing one possible network configuration used in implementing the present invention, according to specific embodiments.

This invention pertains to methods and systems for selecting a best server from a group of servers that can provide similar content to a client. FIG. 1 presents a network level view of one situation where the present invention may be applicable. As shown, various nodes and sites communicate through an external network 107. The external network 107 in this situation can be the Internet, or it can be a variety of other networks with different architectures, protocols, etc. A client 101 initiates a DNS request. The client 101 is configured to send its DNS request to a network node associated with the client 101. According to specific embodiments, this network node is the local DNS server 103.

The local DNS server 103 of the client 101 checks its local memory to determine whether the domain name is already associated with an address it has stored locally. If it determines that the address is not stored locally or if it is stored locally but a predetermined period of time for the mapping between the address and the domain name has elapsed, the local DNS server issues a recursive DNS request for the address associated with the domain name. This request is routed through external network 107 by routers 105 and 109, among others, and arrives at an authoritative DNS server 111.

Typically, though not necessarily, an apparatus for selecting a content server is co-located with a name server. Name servers are typically the network entities with the ability to best determine when a particular domain name has multiple IP addresses. Name servers are also responsible for forwarding selected IP addresses to clients.

Generally, apparatus or logic for selecting a content server is referred to herein as a "server selection system." In FIG. 1, server selection system 113 is co-located with authoritative name server 111. In addition, authoritative DNS server 111 is affiliated with four separate content servers: server 115, server 117, server 119, and server 121.

In one embodiment of the invention, if the authoritative DNS server finds that there is more than one address for the particular domain name, the authoritative DNS server can refer the local DNS server to the server selection system 113 for DNS resolution. In another embodiment, the authoritative DNS server 111 does not check its own memory for address resolution prior to referring a local DNS server 103 to the server selection system 113. The server selection system can be implemented in any suitable computation device or network node. Examples of suitable apparatus that can be adopted to implement the present invention include the DistributedDirector 2500 or DistributedDirector 4700, both available from Cisco Systems, San Jose, Calif. Alternatively, the server selection system 113 can be directly integrated into the authoritative DNS server 111. The server selection system 113 also does not have to be co-located with the authoritative DNS server 111 as illustrated in FIG. 1. The server selection system 113 determines whether multiple servers can provide the content that the client 101 seeks.

The server selection system 113 may determine that each of servers 115, 117, 119, and 121 can provide the content the client seeks. Servers 115 and 121 may be mirror sites carrying identical content. Upon determining the addresses of these servers, the server selection system 113 transmits requests for responses to each of the servers 115, 117, 119, and 121. According to specific embodiments, this request may be a Boomerang Control Protocol message. A request for a response may instruct content servers 115, 117, 119, and 121 to respond immediately or after a certain period of time.

When content servers 115, 117, 119, and 121 receive a request, each content server 115, 117, 119, 121 provides a response corresponding to the request. Considering content server 117 specifically, content server 117 determines possible alterations to the response datagram to convey network characteristics to the network node associated with the client 101. According to specific embodiments, the network node associated with the client 101 is the local DNS server 103. Some of these datagram alterations may include fragmenting and/or padding the response datagram.

According to specific embodiments, the response message is a DNS Reply. Prior to transmission, the content server 117 identifies the maximum size of a datagram that can be transmitted onto a local network 110 to the network node associated with the client 101.

These limits are herein referred to as the network's maximum transfer unit (MTU). MTU sizes can be smaller than 128 octets and may be limited by hardware technologies. According to specific embodiments, the MTU for Ethernet and FDDI are 1500 octets and 4470 octets respectively. The MTU can also be predetermined and associated with either a local network, an external network, arbitrarily set, or mathematically optimized. A datagram arriving at a network with an MTU smaller than its datagram size must be fragmented before it can be transmitted across the network. A datagram arriving at a network with an MTU greater than its datagram size can be transmitted across the network without any fragmentation.

According to specific embodiments, the content server 117 would identify an MTU for Ethernet 110 as 1500 octets. Any datagram larger than the MTU of 1500 octets would have to be fragmented prior to transmission onto the Ethernet 110. The size of a DNS Reply typically allows the reply to be transmitted from a content server 115 through an external network 107 comprising a variety of subnetworks to a network node associated with a client 101 as a single datagram. The response message is smaller than the MTU associated with most types of networks.

Even when the reply datagram can be transmitted without fragmenting the datagram, i.e. the DNS Reply datagram is smaller than the MTU associated with transmission onto the network, the content server 117 can divide the reply datagram into multiple fragments. Alternatively, the reply message itself may already be specified as fragmented datagrams. The other content servers 115, 121, and 119 can also fragment the DNS Reply datagram prior to transmitting the response to the network node associated with the client 101. The first content server to successfully complete transmission of the reply fragments to the network node associated with the client 101 for selecting a content server can be identified as the best server for providing content to a client 101. According to specific embodiments, this network node associated with the client 101 for selecting a content server is the local DNS server 103. According to other specific embodiments, the network node associated with the client 101 for selecting a content server is the server selection system 113.

Fragments travel as separate datagrams to a destination before they are reassembled. Fragments can travel along different routes from the same source to the same destination. In some embodiments, the fragments may be divided into smaller fragments if they traverse a network with an MTU smaller than the fragment. In one situation of particular interest, fragments of the response datagram transmitted by content server 115 may be dropped by router 112, or dropped by a router in external network 107. If any fragments are lost, the DNS Reply message can not be reassembled. The destination node for the message typically starts a timer after receiving an initial fragment.

If the timer expires before the destination node receives all of the fragments, all of the other fragments are discarded without processing the message.

The content server 115 would be unable to successfully complete transmission of the reply message to the network node associated with the client 101 when packets are dropped during transmission from the content server 115 to the network node associated with the client 101. A separate content server 121 may be simultaneously attempting to transmit a similar reply message. Another server 121 may also be fragmenting the reply message prior to transmitting the datagram to the network node associated with the client 101, while a different server 119 may not be fragmenting datagrams. The server that can successfully complete transmission of the reply message can be selected as the best content server.

Content servers connected to the network node associated with the client 101 through network lines with high drop rates will more likely be unsuccessful in transmitting all of the fragments of a reply message to the network node associated with the client 101. Content servers connected through network lines that allow all of the fragments to be successfully transmitted will be selected based on response time for the receipt of all of the fragments. The content servers are able to provide network characteristics such as drop rate and round trip time to the network node associated with the client 101. Information on other characteristics is provided as well.

According to specific embodiments, content server 115 can also pad response datagrams to provide network information to the network node associated with the client 101. When content server 115 receives a request, content server 115 provides a response corresponding to the request. According to specific embodiments, this response may be termed Boomerang Control Protocol Reply or a DNS Reply. Prior to transmission, the content server 115 increases the layer three length while leaving the layer four length unaltered. The reply datagram can be padded with an arrangement of bits to create an altered response datagram. When a router 112 receives the padded reply message, it identifies the length of the message based on the layer three length. This can be the total length field of an IP datagram, which is limited to 65,535 octets.

The router 112 then determines whether to queue, drop, transmit the datagram. The router 112 may use best-effort delivery and transmit the datagram when bandwidth is available. If no bandwidth is available, the router 112 may leave the packet in the queue for a certain period of time. If this period of time expires, the packet may be dropped. The router may also use a variety of traffic shaping and policing algorithms to determine whether the packet should be transmitted. Typically, the larger the datagram, the less likely the datagram will be immediately transmitted unless ample bandwidth is available.

Limited network bandwidth may prevent router 112 from transmitting a padded reply message to a local domain name server 103 even though a non-padded message may have been successfully transmitted. Other content servers 117, 121, and 119 may or may not be padding corresponding reply messages.

Content servers connected to the network node associated with the client 101 through network lines with limited bandwidth will typically not be successful in transmitting the padded reply datagram. Content servers connected through network lines that allow all of the fragments to be successfully transmitted will be selected based on response time for the receipt of all of the fragments. When the network node associated with the client 101 receives the response message, the message is processed by removing the excess from the network layer length field. Data used to pad the message can be dropped. The content servers are able to provide network characteristics such as bandwidth availability, drop rate, and round trip time to the network node associated with the client 101.

According to specific embodiments, content server 115 upon receiving a request for a response may divide the response message into fragments and/or pad the fragments. A response message may be provided and transmitted as multiple fragments. The content server 115 may transmit the fragments in any suitable order and frequency. For instance, the fragments may be transmitted simultaneously or sequentially. When fragments for each response are transmitted simultaneously, each set of fragments may be transmitted at predetermined or random time intervals. When the fragments of a particular response are transmitted sequentially, the content server 115 may transmit the fragments at a predetermined or a random rate. Some of these fragments may be padded with data of varying length. Each of the fragments with various amounts of data padding would have to arrive at the network node associated with the client 101 before a content server can be selected optimally content server.

Figure 2:
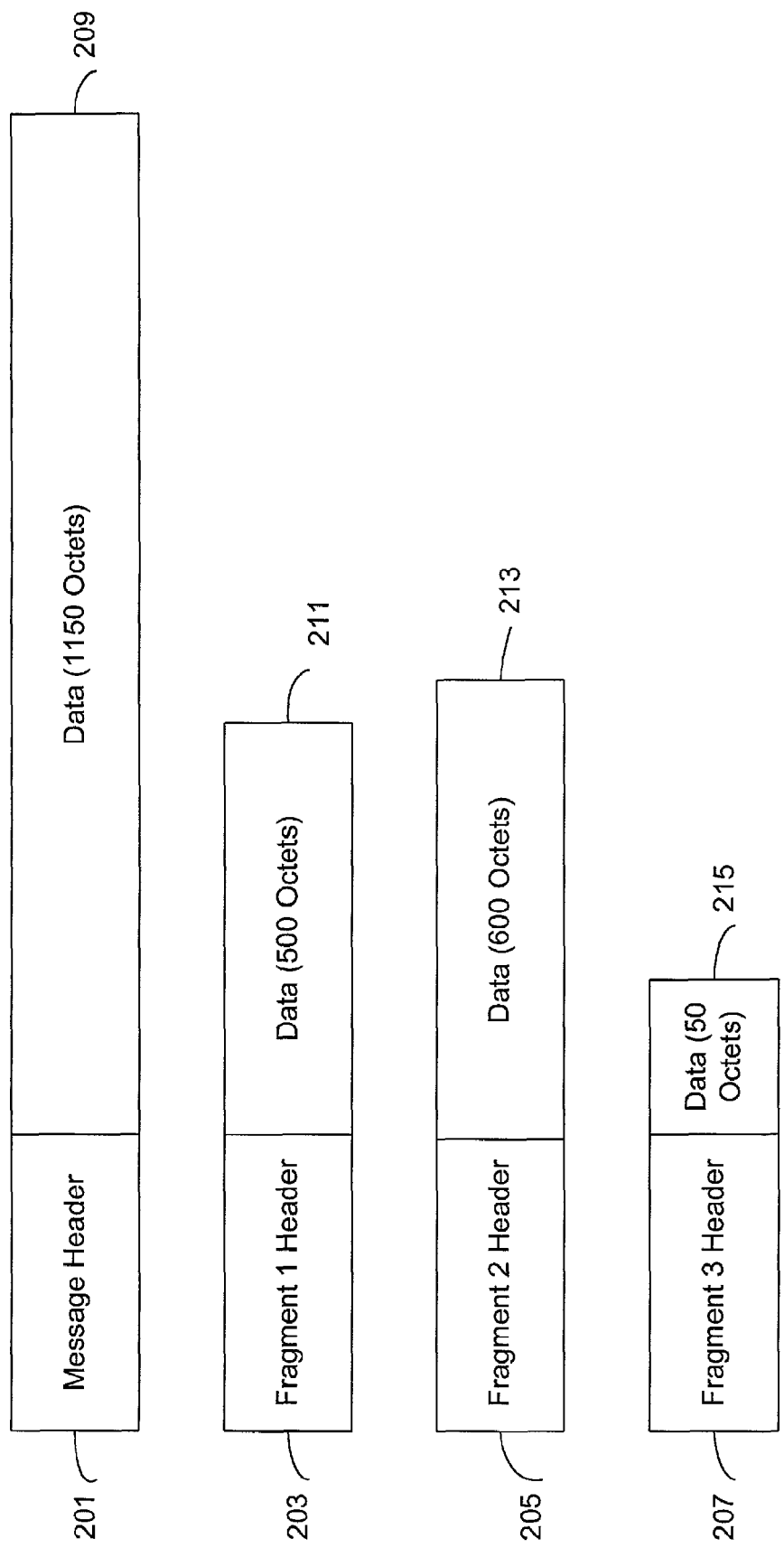
FIG. 2 is a process flow diagram illustrating selecting an optimal server according to specific embodiments.

FIG. 2 shows a response message that a content server provides upon receiving a request for a response, according to specific embodiments. The response message header 201 contains fields identifying the datagram, providing information about characteristics of the datagram such as the total length, and detailing source and destination information. The datagram with header 201 has a payload of data 209 containing 1150 octets. The content server or content routing agent divides this datagram into multiple fragments with headers 203, 205, and 207. These headers 203, 205, and 207 contain information for the destination node to reassemble the datagram. Each fragment can contain varying amounts of data 209. Fragments with headers 203, 205, and 207 can contain payloads 211, 213, and 215 with 500 octets, 600 octets, and 50 octets of data respectively. According to specific embodiments, a fragment with header 205 can be padded with data not derived from payload 209.

Figure 3:
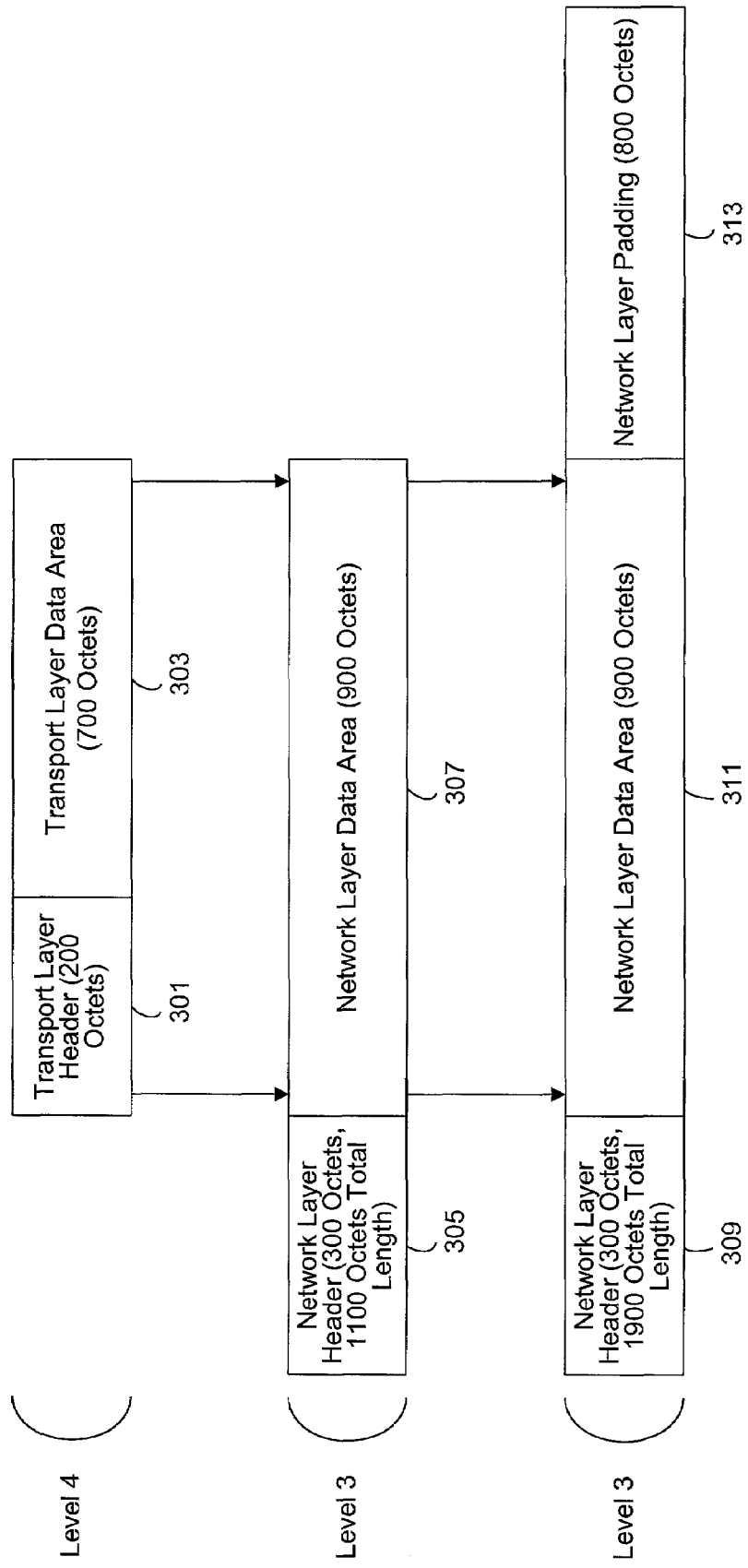
FIG. 3 is a diagram depicting arrangements of metric priorities and significance windows, according to specific embodiments.

FIG. 3 shows datagram padding according to specific embodiments. An entire response message may be padded or each fragment of a response message may be separately padded. A level 4 packet with transport layer header 301 and transport layer data 303 has a total length of 900 octets. The transport layer header contains fields that can be used to specify the length of the transport layer data 303 and the length of the header 301. The content server or content routing agent provides this packet and provides a network layer header with a length of 300 octets. This header contains information that can be used to identify the source and destination nodes, total length and payload length, and characteristics of the datagram.

The network layer data area 307 contains the transport layer header 301 and the transport layer data area 303. The transport layer header 301 is encapsulated in the network layer datagram for transmission onto a network. A content server can pad a datagram with network layer padding 313 by altering the length of the datagram specified in network layer header 309. The length specified in the transport layer header 301 encapsulated in network layer data area 311 is left unaltered. The transport layer header 301 specifies that the transport layer data area is 700 octets. The network layer header 309 specifies that the network layer total length is 1900 octets with 800 octets of padding.

Generally, the datagram padding and fragmentation techniques of the present invention may be implemented on software and/or hardware. For example, each of the described techniques can be implemented in an operating system kernel, in a separate user process, in a library package bound into network applications, on a specially constructed machine, or on a network interface card. According to specific embodiments, the techniques of the present invention are implemented in software such as an operating system or in an application running on an operating system.

Software or software/hardware hybrid implementations of the invention may be implemented on general-purpose programmable machines selectively activated or reconfigured by a computer program(s) stored in memory. Such programmable machines may be a network device designed to handle network traffic. Such network devices typically have multiple network interfaces including frame relay and ISDN interfaces, for example. Specific examples of such network devices include routers, switches, and content routing agents. For example, embodiments of the present invention may be implemented on specially configured routers such as specially configured router models 1600, 2500, 2600, 3600, 4500, 4700, 7200, 7500, and 12000 or specially configured content routing agents models 4400 and 4450 available from Cisco Systems, Inc. of San Jose, Calif. A general architecture for some of these machines will appear from the description given below. In an alternative embodiment, the present invention may be implemented on a general-purpose network host machine such as a personal computer or workstation. Further, the invention may be at least partially implemented on a card (e.g., an interface card) for a network device or a general-purpose computing device.

Referring now to FIG. 4, a router 410 suitable for implementing the present invention includes a master central processing unit (CPU) 462, interfaces 468, and a bus 415

(e.g., a PCI bus). When acting under the control of appropriate software or firmware, the CPU 462 is responsible for such router tasks as routing table computations and network management. It may also be responsible for padding or fragmenting datagrams. It preferably accomplishes all these functions under the control of software including an operating system (e.g., the Internetwork Operating System (IOS®) of Cisco Systems, Inc.) and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system. Memory block 461 may be used for a variety of purposes such as, for example, caching and/or storing data, programming instructions, etc.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network node of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 465) configured to store data, program instructions for the general-purpose network operations and/or the packet redirection and replication functions described herein. The program instructions may control the operation of an operating system and/or one or more applications, for example. The memory or memories may also be configured to store packets for replication, replicated packets, packet identification criteria, etc.

Information and program instructions may be employed to implement the systems/methods described herein. The present invention can relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as that produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. The server selection system and its accompanying DNS server have a variety of embodiments which include an server selection system coupled with a DNS server. Therefore, the scope of the invention should be determined with reference to the appended claims.

What is claimed is:

1. A method for providing information for selecting a content server to a network node associated with a client, the method comprising:
   receiving a request for a response, wherein the request corresponds to a message transmitted by a network node associated with a client for selecting a content server;
   providing a response datagram, the response datagram associated with the received request, wherein network requirements allow transmission of the response datagram to the network node without padding the response datagram;
   providing a padded response datagram, wherein the padded response datagram is obtained by padding the response datagram with an arrangement of bits; and
   transmitting the padded response datagram to the network node associated with the client for selecting a content server wherein reception of the padded response datagram by the network node provides information for selecting a content server.

2. The method of claim 1, wherein the request is a Boomerang Control Protocol message.

3. The method of claim 1, wherein the response is a DNS reply.

4. The method of claim 1, wherein the bits are randomly generated.

5. The method of claim 1, wherein the network node associated with the client for selecting a content server is a local domain name server.

6. A method for providing information associated with a network for selecting a content server, the method comprising:
   receiving a request from the server selection system for a response message;
   providing a response datagram, the response datagram corresponding to the response message, wherein the response datagram is associated with a network layer length, a transport layer length, and a network layer header length;
   providing an altered response datagram, wherein the network layer length is greater than the sum of the transport layer length and the network layer header length;

transmitting the altered response datagram to a node responsible for selecting a content server, wherein receipt of the altered response datagram provides information on network characteristics to a server selection system.

7. The method of claim 6, wherein the request is a Boomerang Control Protocol message.

8. The method of claim 7, wherein the response is a DNS Reply.

9. The method of claim 6, wherein the altered response datagram is padded with data.

10. The method of claim 9, wherein the data is randomly generated.

11. A computer program product comprising a machine readable medium on which is provided program instructions for providing network information to a network node associated with a client, the computer program product comprising:
   computer code for receiving a request for a response, wherein the request corresponds to a message transmitted by the network node associated with a client for selecting a content server;
   computer code for providing a response datagram, the response datagram associated with the received request, wherein network requirements allow transmission of the response datagram to the network node without padding the response datagram;
   computer code for providing a padded response datagram, wherein the padded response datagram is obtained by padding the response datagram with an arrangement of bits; and
   computer code for transmitting the padded response datagram to the network node associated with the client for selecting a content server wherein reception of the padded response datagram by the network node provides information for selecting a content server.

12. The computer program product of claim 11, wherein the request is a Boomerang Control Protocol message.

13. The computer program product of claim 12, wherein the response is a DNS reply.

14. The computer program product of claim 13, wherein reception of the padded response datagram by the network node provides bandwidth availability information to the network node associated with the client.

15. The computer program product of claim 11, wherein the network layer length of the response datagram is increased while the transport layer length field is unmodified.

16. The computer program product of claim 11, wherein the arrangement of bits is randomly generated.

17. An apparatus for providing network information for selecting a content server to a network node associated with a client, the apparatus comprising:
   memory;
   an input interface for receiving a request for a response, wherein the request corresponds to a message transmitted by the network node associated with a client for selecting a content server;
   one or more processors coupled with the memory, the processors configured to provide a response datagram, the response datagram corresponding to the received request, wherein the response datagram can be transmitted without padding and wherein the processors are configured to provide a padded response datagram, the padded response datagram obtained by padding the response datagram with an arrangement of bits;
   an output interface for transmitting the padded response datagram to the network node associated with the client wherein reception of the padded response datagram by the network node provides information for selecting a content server.

18. The apparatus of claim 17, wherein the network node associated with the client is a local domain name server.

19. The apparatus of claim 17, wherein the network node associated with the client is a server selection system.

20. The apparatus of claim 17, wherein the request is a Boomerang Control Protocol message.

21. The apparatus of claim 17, wherein the response is a DNS Reply.

22. The apparatus of claim 17, wherein the padded response datagram can be trimmed to form a DNS Reply.

23. The apparatus of claim 17, wherein the response datagram correspond to a network layer length field and a transport layer let field.

24. The apparatus of claim 23, wherein the network layer length field is increased while the transport layer length field is unmodified.

25. The apparatus of claim 17, wherein the arrangement of bits is randomly generated.

26. A apparatus for providing information for selecting a content server to a network node associated with a client, the apparatus comprising:
   means for receiving a request for a response, wherein the request corresponds to a message transmitted by a network node associated with a client for selecting a content server;
   means for providing a response datagram, the response datagram associated with the received request, wherein the response datagram can be transmitted without padding;
   means for providing a padded response datagram, wherein the padded response datagram is obtained by padding the response datagram with an arrangement of bits; and
   means for transmitting the padded response datagram to the network node associated with the client for selecting a content server wherein reception of the padded response datagram by the network node provides information for selecting a content server.

27. The apparatus of claim 26, wherein the response datagram corresponds to a network layer length field and a transport layer length field.

28. The apparatus of claim 27, wherein the network layer length field is increased while the transport layer length field is unmodified.

29. The apparatus of claim 26, wherein the arrangement of bits is randomly generated.

* * * * *